(12) United States Patent
Dehm et al.

(10) Patent No.: US 11,162,537 B2
(45) Date of Patent: Nov. 2, 2021

(54) BEARING COVER

(71) Applicant: Dr. Ing. h.c. F. Porsche Aktiengesellschaft, Stuttgart (DE)

(72) Inventors: Oliver Dehm, Leonberg (DE); Werner Schiek, Jettingen (DE); Soeren Kunde, Schwaikheim (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/930,377

(22) Filed: Jul. 16, 2020

(65) Prior Publication Data

US 2021/0018044 A1 Jan. 21, 2021

(30) Foreign Application Priority Data

Jul. 16, 2019 (DE) ...................... 10 2019 119 224.2

(51) Int. Cl.

| F16C 41/00 | (2006.01) |
| F16C 19/52 | (2006.01) |
| F16C 35/06 | (2006.01) |
| F16C 35/07 | (2006.01) |
| G01P 3/44 | (2006.01) |
| F16C 35/067 | (2006.01) |
| F16C 35/077 | (2006.01) |

(52) U.S. Cl.
CPC .......... *F16C 41/002* (2013.01); *F16C 35/067* (2013.01); *F16C 35/077* (2013.01); *G01P 3/443* (2013.01); *F04C 2240/30* (2013.01); *F16C 2380/26* (2013.01)

(58) Field of Classification Search
CPC ...... F16C 19/52; F16C 35/067; F16C 35/077; F16C 41/002; F16C 2202/30; F16C 2370/00; F16C 2380/26; F16C 2240/26; G01P 3/443; H02K 5/1737; H02K 24/00; F04C 2240/10; F04C 2240/30; F04C 2240/40
USPC .................................. 384/448, 456; 180/444
See application file for complete search history.

(56) References Cited

U.S. PATENT DOCUMENTS

| 2004/0141669 A1* | 7/2004 | Landrieve ............. F16C 13/006 384/448 |
| 2010/0180664 A1 | 7/2010 | Wilhelmy et al. |
| 2011/0067945 A1* | 3/2011 | Sonoda .................. H02K 24/00 180/444 |

FOREIGN PATENT DOCUMENTS

| CN | 201584852 U | * | 9/2010 | ............... H02K 9/06 |
| CN | 202906705 U | * | 4/2013 | |
| CN | 103443503 A | * | 12/2013 | ............. F16C 27/066 |
| CN | 205509742 U | * | 8/2016 | |
| CN | 207615710 U | * | 7/2018 | |
| CN | 209726986 U | * | 12/2019 | |
| DE | 19818059 A1 | * | 10/1999 | ............. F16C 35/077 |
| DE | 103 61 886 | | 1/2005 | |
| DE | 102005026507 A1 | * | 12/2006 | ............. B21D 22/21 |
| DE | 20 2006 018 877 | | 5/2008 | |

(Continued)

*Primary Examiner* — Marcus Charles
(74) *Attorney, Agent, or Firm* — Gerald E. Hespos; Michael J. Porco; Matthew T. Hespos

(57) ABSTRACT

A bearing cover (10) has a bearing receiving space (18) for a bearing (9) and has a fastening region (17) for fastening the bearing cover (10) to a housing body (7). The bearing receiving space (18) of the bearing cover (10) is decoupled electrically from the fastening region (17) of the bearing cover (10) to prevent an undesired flow of electric current across the bearing (9).

7 Claims, 2 Drawing Sheets

(56) References Cited

FOREIGN PATENT DOCUMENTS

| | | | | |
|---|---|---|---|---|
| DE | 20 2013 102 753 | | 11/2014 | |
| DE | 10 2014 205 328 | | 6/2015 | |
| DE | 102015000259 A1 | * | 7/2016 | ............ B63H 23/24 |
| EP | 1 397 690 | | 4/2010 | |
| EP | 3 089 336 | | 11/2016 | |
| JP | 2716312 B2 | * | 2/1998 | ............ F16C 35/077 |
| JP | 2000156952 A | * | 6/2000 | ............ F16C 35/077 |
| JP | 2004166355 A | * | 6/2004 | ............ F16C 35/06 |
| JP | 2009133483 A | * | 6/2009 | ......... F16C 33/3806 |
| JP | 2011151978 A | * | 8/2011 | ............ F16C 35/077 |
| JP | 2018039619 A | * | 3/2018 | ............ H02K 5/173 |
| KR | 200448918 Y1 | * | 6/2010 | ............ F04C 13/003 |
| WO | WO-2005042992 A1 | * | 5/2005 | ............ F16C 27/066 |
| WO | 2009/015735 | | 2/2009 | |
| WO | 2015/090388 | | 6/2015 | |
| WO | WO-2020089011 A1 | * | 5/2020 | ............ H02K 5/225 |

* cited by examiner

BEARING COVER

CROSS REFERENCE TO RELATED APPLICATION

This application claims priority under 35 USC 119 to German Patent Appl. No. 10 2019 119 224.2 filed on Jul. 16, 2019, the entire disclosure of which is incorporated herein by reference.

BACKGROUND

Field of the Invention

The invention relates to a bearing cover having a bearing receiving space for a bearing and having a fastening region by way of which the bearing cover can be fastened to a housing body. The invention further relates to a rotation speed sensor for an electrical machine with a stator and with a rotor that can rotate relative to the stator. The rotor has a rotor shaft with a bearing arranged in a bearing receiving space of a bearing cover.

Related Art

EP 3 089 336 A1 discloses an insulation cover of a rotation speed sensor that covers and insulates a stator of the rotation speed sensor. DE 10 2014 205 328 A1 discloses a signal wire connection structure for an external rotor rotation sensor with an annular external rotor stator and an annular insulating covering. DE 103 61 886 B3 discloses a rotation speed sensor with a hollow shaft that is mounted rotatably in a housing. A scanning head and an incremental disk are arranged in the housing. The incremental disk is connected to the hollow shaft, and a bushing is enclosed by the hollow shaft and by way of which the hollow shaft can be connected to the shaft to be monitored. The bushing is mounted in the interior of the hollow shaft with the interposition of a sleeve made of vibration-damping material. The material that forms the sleeve is electrically insulating. WO 2015/090388 A1 discloses a sensor bearing unit comprising an electrically insulating plastic housing. DE 20 2013 102 753 U1 discloses a rotation speed sensor comprising a roller bearing for mounting a drive shaft. The roller bearing is arranged in an aluminum housing with an anodized bearing receiving face for preventing bearing currents. WO 2009/015735 A2 discloses a rotation speed sensor with a transmitter shaft which mounted by means of an insulating intermediate ring for the purpose of preventing bearing currents. EP 1 397 690 B1 discloses a rotation speed sensor comprising a plastic housing on which a shaft is mounted. DE 20 2006 018 877 U1 discloses a rotation speed sensor comprising a plastic housing on which a shaft is mounted. The plastic housing has a core plate composed of aluminum.

The object of the invention is to improve a bearing cover in terms of function and/or manufacture.

SUMMARY

The invention relates to a bearing cover having a bearing receiving space for a bearing and having a fastening region by way of which the bearing cover can be fastened to a housing body. The bearing receiving space of the bearing cover is decoupled electrically from the fastening region of the bearing cover to prevent an undesired flow of electric current across the bearing. The bearing receiving space of the bearing cover may be a straight circular cylindrical casing section. The bearing may be a conventional roller bearing with roller bodies composed of metal. The design of the bearing cover provides the advantage that a conventional roller bearing with roller bodies composed of metal can be used instead of a relatively expensive roller bearing with ceramic roller bodies.

The bearing cover has fastening eyelets in the fastening region. The fastening eyelets are arranged radially on the outside of the cover body. The term radial relates to a rotation axis of the rotor shaft. The fastening eyelets allow passage of fastening means, such as fastening screws, by way of which the bearing cover can be fastened to the housing body. The bearing receiving space is arranged radially on the inside of the bearing cover.

The bearing cover may comprise both the bearing receiving space and a seal receiving space radially on the inside. The seal receiving space in the bearing cover receives a radial shaft sealing ring in the bearing cover.

The bearing cover may comprise a cover body that has the fastening region radially on the outside and the bearing receiving space radially on the inside. The cover body may be a circular disk, and the fastening eyelets may be radially on the outside of the circular disk to form the fastening region. Radially inner parts of the cover body may form the bearing receiving space and the seal receiving space.

The bearing cover may be formed entirely or partially from the electrically insulating plastic. The electrically insulating plastic may be designed and arranged in such that the bearing receiving space of the bearing cover is electrically decoupled from the fastening region of the bearing cover and from fastening elements associated with the bearing cover. Forming the bearing cover entirely from the electrically insulating plastic material provides an advantageous saving in weight. Furthermore, the bearing cover can be manufactured in a cost-effective manner in large numbers from plastic by injection molding.

The bearing cover may comprise a sleeve composed of a metal that forms the bearing receiving space. The metal can be electrically conductive. The use of metal for the bearing sleeve improves stability of the bearing cover. The sleeve is substantially in the shape of a straight circular cylindrical casing and may comprise or consist of an electrically insulating material.

Fastening arms may extend from the sleeve composed of the metal material and may form the fastening region. The fastening arms may be connected integrally to the sleeve composed of metal. The fastening arms may extend radially out from the sleeve, and free ends of the fastening arms may have the fastening eyelets for forming the fastening region. The metal fastening arms provide particularly stable fastening of the bearing cover.

The fastening arms may be surrounded by the electrically insulating plastic. The fastening arms, in particular the fastening eyelets, advantageously may be surrounded entirely by the electrically insulating plastic. As a result, the desired electrical decoupling of the bearing receiving space from the fastening region of the bearing cover is rendered possible in a simple manner.

The cover body having the fastening region may be formed from a metal material and is combined with a sleeve composed of a plastic material. The sleeve of this embodiment comprises the bearing receiving space. The sleeve composed of the plastic material may be pressed into the cover body composed of the metal material to provide a particularly stable cover body. The metal from which the cover body is formed can be electrically conductive. Thus, the desired electrically insulating effect can be realized solely by the sleeve composed of the plastic material.

The invention further relates to a rotation speed sensor for an electrical machine that comprises a stator and a rotor. The rotor can rotate relative to the stator and has a rotor shaft with a bearing arranged in a bearing receiving space of the above-described bearing cover. The bearing may be a roller bearing for mounting the rotor shaft. However, the bearing cover can also receive or fasten a stub shaft.

The invention further relates to a cover body and/or to a sleeve for an above-described rotation speed sensor. These parts can be handled separately.

The invention may also relate to a tool for producing a bearing cover with a cover body and/or a sleeve.

The invention may also relate to an electrical machine comprising the above-described rotation speed sensor.

The invention may also relate to a motor vehicle comprising an electrical machine of this kind.

Further advantages, features and details of the invention can be gathered from the following description in which various exemplary embodiments are described in detail with reference to the drawing.

DETAILED DESCRIPTION

Figure 6:
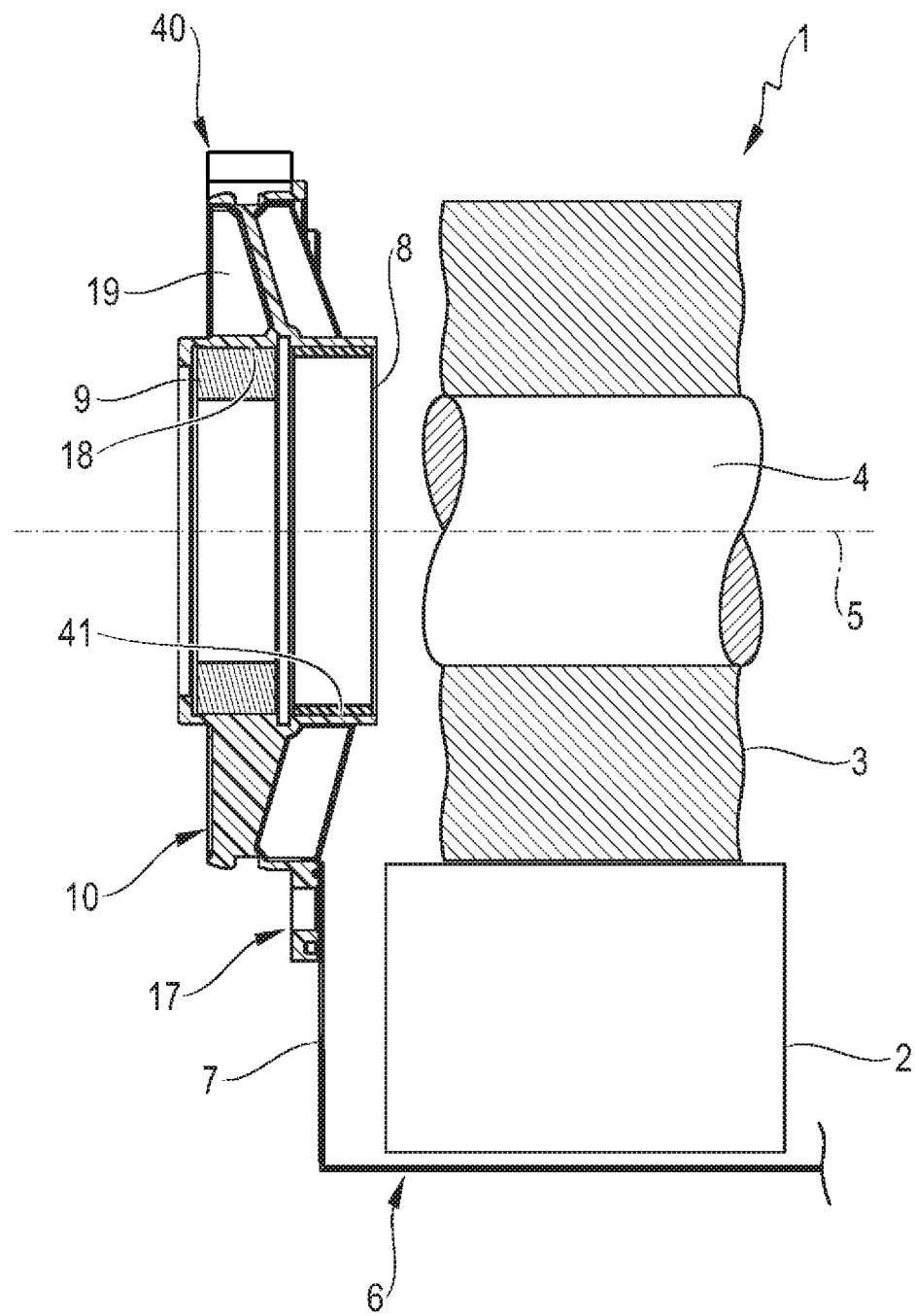
FIG. 6 is a partially highly schematic sectional illustration of an electrical machine that comprises a stator and a rotor that can rotate relative to the stator and has a rotor shaft rotatably mounted by a roller bearing arranged in a bearing receiving space of the bearing cover of FIG. 1.

FIG. 6 illustrates a highly simplified section through an electrical machine 1 of a motor vehicle. The electrical machine 1 comprises a stator 2 and a rotor 3. The rotor 3 can be rotated, by way of a rotor shaft 4, about a rotation axis 5 relative to the stator 2 in a housing 6. A rotation speed sensor 40 is provided to detect the rotation speed. The rotation speed sensor 40 may be of known design.

The housing 6 comprises a housing body 7 with an opening is surrounded by a bearing cover 10 of the rotation speed sensor 40. The bearing cover 10 comprises a fastening region 17 radially on the outside. In the fastening region 17, the bearing cover 10 is fastened to the housing body 7 with the aid of fastening means (not illustrated). The bearing cover 10 comprises a bearing receiving space 18 for receiving a bearing 9, in particular a roller bearing 9, radially on the inside.

The roller bearing 9 serves to rotatably mount the rotor shaft 4. The bearing cover 10 comprises, in addition to the bearing receiving space 18, a seal receiving space 41 for receiving a radial shaft sealing ring 8 radially on the inside. The radial shaft sealing ring 8, through which the rotor shaft 4 extends, functions to seal off a housing interior of the electrical machine 1 from the surrounding area.

A total of six fastening eyelets 11 to 16 are fitted to the bearing cover 10 for the purpose of forming the fastening region 17. The fastening eyelets 11 to 16 each comprise a passage hole for the passage of a fastening means, such as a screw. The design and the function of the bearing cover 10 in FIGS. 1 to 5 are substantially the same. However, the three different variants of the bearing cover 10 which are illustrated in FIGS. 1 to 5 comprise different cover bodies 19; 29; 39.

Figure 1:
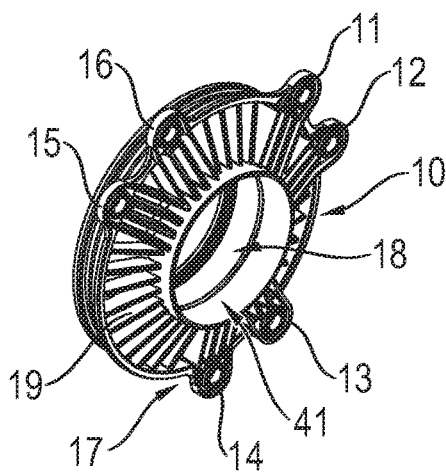
FIG. 1 is a perspective of a bearing cover for a rotation speed sensor according to a first embodiment.

FIG. 1 is a perspective view of the bearing cover 10 with the cover body 19 from FIG. 6 on its own. The cover body 19 of the bearing cover 10 in FIG. 1 is formed entirely from an electrically insulating plastic. The fastening eyelets 11 to 16 are integrally connected to the cover body 19 and formed from the same material as the bearing receiving region 18 and the seal receiving region 41 of the bearing cover 10.

Figure 2:
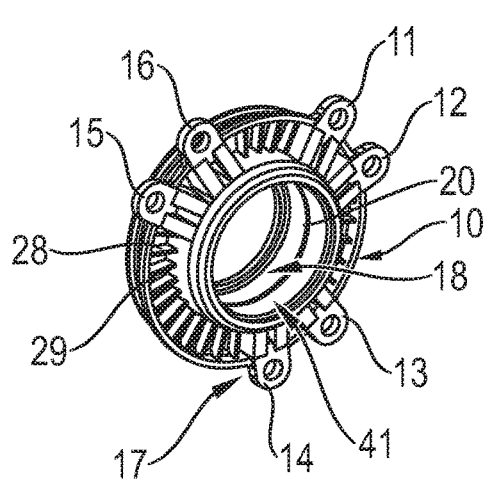
FIG. 2 is a similar illustration to FIG. 1 of a rotation speed sensor according to a second embodiment with an insert part composed of metal material.
Figure 3:
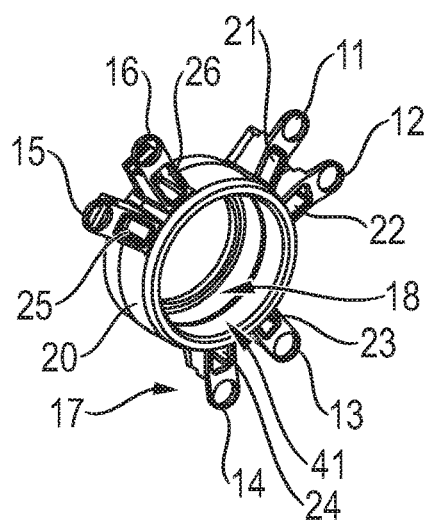
FIG. 3 is a perspective illustration of the insert part from FIG. 2 on its own.

The cover body 29 of the second variant, illustrated in FIGS. 2 and 3, of the bearing cover 10 comprises a sleeve 20, which is shown in a perspective view on its own in FIG. 3. The sleeve 20 is formed from a metal material. A total of six fastening arms 21 to 26 extend radially outward from the sleeve 20. The fastening arms 21 to 26 are integrally connected to the sleeve 20.

The fastening eyelets 11 to 16 are cut out from the free ends of the fastening arms 21 to 26. The fastening arms 21 to 26 with the fastening eyelets 11 to 16 are surrounded entirely by an insulating plastic material 28, as shown in FIG. 2.

The bearing cover 10 illustrated in FIG. 2 is produced, for example, using a plastic injection-molding process. The sleeve 20 with the fastening arms 21 to 26 is an insert part that is encapsulated by injection molding with the insulating plastic material 28 in an appropriate injection mold.

Figure 4:
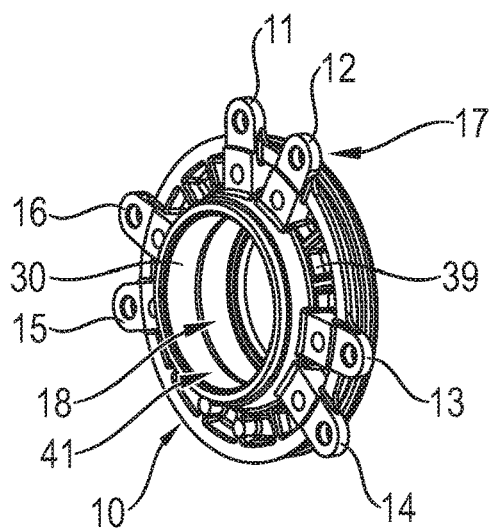
FIG. 4 is a similar illustration to FIG. 1 of a rotation speed sensor according to a third embodiment comprising a sleeve composed of a plastic material.
Figure 5:
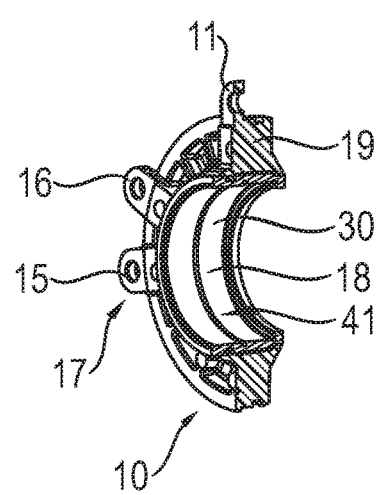
FIG. 5 is a perspective sectional illustration of the bearing cover of FIG. 4.

In the third variant, illustrated in FIGS. 4 and 5, of the bearing cover 10, the cover body 39 with the fastening eyelets 11 to 16 is formed from a metal material. A sleeve 30 composed of a plastic material is pressed into the metal cover body 39. The sleeve 30 is formed from an electrically insulating plastic material for the purpose of electrically decoupling the fastening region 17 from the bearing receiving space 18.

What is claimed is:

1. A bearing cover comprising:
a sleeve formed from metal and having a bearing receiving space formed radially on an inside of the sleeve for receiving a bearing;
fastening arms extending out on from the sleeve and being formed from metal, each of the fastening arms having a fastening region configured for fastening the bearing cover to a housing body;
a cover body disposed on a radially outer side of the sleeve and being formed from an electrically insulating plastic so that the electrically insulating plastic of the cover body surrounds the fastening arms, wherein:
the electrically insulating plastic of the cover body separates the bearing receiving space of the sleeve electrically from the fastening region of the bearing cover to prevent flow of electric current across the bearing.

2. The bearing cover of claim 1, wherein the bearing cover has fastening eyelets in the fastening region.

3. The bearing cover of claim 1, wherein the bearing cover further comprises a seal receiving space.

4. An electrical machine that comprises: a stator; a rotor that can rotate relative to the stator; the bearing cover of claim 1 and a bearing arranged in the bearing receiving space of the bearing cover.

5. The electrical machine of claim 4, further comprising a rotation speed sensor mounted to the bearing cover and configured for sensing rotation speed of the rotor.

6. The bearing cover of claim 1, wherein the sleeve and the fastening arms define an insert about which the electrically insulating plastic is molded so that the fastening arms are encapsulated and surrounded completely by the electrically insulating plastic.

7. The bearing cover of claim 1, wherein the fastening arms extend integrally from the sleeve.

* * * * *